(12) United States Patent
Cai (10) Patent No.: US 10,469,806 B2
(45) Date of Patent: *Nov. 5, 2019

(54) LIGHTING DEVICE WITH LOW VOLTAGE POWER OUTPUT PORTS AND SURVEILLANCE AND LIGHTING SYSTEM HAVING SAME

(71) Applicant: Xing Mike Cai, Duluth, GA (US)

(72) Inventor: Xing Mike Cai, Duluth, GA (US)

(*) Notice: Subject to any disclaimer, the term of this patent is extended or adjusted under 35 U.S.C. 154(b) by 2 days.

This patent is subject to a terminal disclaimer.

(21) Appl. No.: 16/013,004

(22) Filed: Jun. 20, 2018

(65) Prior Publication Data

US 2018/0316894 A1 Nov. 1, 2018

Related U.S. Application Data

(63) Continuation-in-part of application No. 15/730,914, filed on Oct. 12, 2017, now Pat. No. 10,403,108.
(Continued)

(30) Foreign Application Priority Data

Jun. 28, 2017 (CN) ................... 2017 2 0762551 U
Jan. 16, 2018 (CN) ................... 2018 2 0066424 U
(Continued)

(51) Int. Cl.
*H04N 7/18* (2006.01)
*G08B 13/196* (2006.01)
(Continued)

(52) U.S. Cl.
CPC .......... *H04N 7/181* (2013.01); *G08B 13/1966* (2013.01); *H04N 5/77* (2013.01);
(Continued)

(58) Field of Classification Search
CPC .......... H04N 7/181; H04N 7/185; H04N 5/77; H04N 7/188; H04N 5/33; H05B 33/0806;
(Continued)

(56) References Cited

U.S. PATENT DOCUMENTS

9,408,282 B1* 8/2016 Springer ............ H05B 37/0272
9,784,417 B1* 10/2017 Springer ................. F21K 9/238
(Continued)

*Primary Examiner* — Richard A Hansell, Jr.
(74) *Attorney, Agent, or Firm* — Locke Lord LLP; Tim Tingkang Xia, Esq.

(57) ABSTRACT

The lighting device has a at least one low-voltage power output port to provide low voltage power to an wireless imaging device detachably connected to the at least one low-voltage power output port; a lighting member; a microcontroller unit (MCU) coupled with the power module and the lighting member for controlling operations of the lighting member; and a power module coupled between a standard AC power source and the low-voltage power output port/MCU for converting an AC power of the standard AC power source to at least one low-voltage DC/AC power. Also, a surveillance and lighting system utilizing the lighting device with at least one low voltage power output port and an existing electricity wiring for its wireless imaging device power supply, including imaging and lighting devices and a network video recorder (NVR) wirelessly coupled together.

16 Claims, 7 Drawing Sheets

Related U.S. Application Data (60) Provisional application No. 62/490,396, filed on Apr. 26, 2017.

(30) Foreign Application Priority Data

Apr. 24, 2018 (CN) .......................... 2018 1 0369688
Apr. 24, 2018 (CN) .................... 2018 2 0584193 U (51) Int. Cl.
| | |
|---|---|
| *H05B 37/02* | (2006.01) |
| *H05B 33/08* | (2006.01) |
| *H04N 5/77* | (2006.01) |
| *H04N 5/33* | (2006.01) |

(52) U.S. Cl.
CPC .......... *H04N 7/188* (2013.01); *H05B 33/0845* (2013.01); *H05B 37/0272* (2013.01); *H04N 5/33* (2013.01)

(58) Field of Classification Search
CPC ............ H05B 37/0272; H05B 33/0845; G08B 13/19613; G08B 13/1966
See application file for complete search history.

(56) References Cited

U.S. PATENT DOCUMENTS

| | | | |
|---|---|---|---|
| 2007/0052804 A1* | 3/2007 | Money ..................... | H04N 5/76 348/143 |
| 2012/0044354 A1* | 2/2012 | Cheng ................ | H04N 5/23203 348/159 |
| 2015/0077567 A1* | 3/2015 | Scalisi ................ | H04M 1/0291 348/152 |
| 2016/0073479 A1* | 3/2016 | Erchak .................... | F21S 9/022 315/51 |
| 2016/0261824 A1* | 9/2016 | Scalisi ................... | H04N 7/142 |
| 2017/0134635 A1* | 5/2017 | Cho ....................... | H04W 76/14 |
| 2017/0244934 A1* | 8/2017 | Chien ................... | H04N 7/181 |
| 2018/0035084 A1* | 2/2018 | Swiss ..................... | H04N 7/183 |

* cited by examiner

LIGHTING DEVICE WITH LOW VOLTAGE POWER OUTPUT PORTS AND SURVEILLANCE AND LIGHTING SYSTEM HAVING SAME

CROSS-REFERENCE TO RELATED PATENT APPLICATIONS

This application is a continuation-in-part application of U.S. patent application Ser. No. 15/730,914, filed Oct. 12, 2017, which itself claims priority to and the benefit of U.S. provisional patent application Ser. No. 62/490,396, filed Apr. 26, 2017, and Chinese patent application Serial No. 201720762551.0, filed Jun. 28, 2017, which are incorporated herein in their entireties by reference.

This application also claims priority to and the benefit of Chinese patent application Chinese patent application Serial No. 201720762551.0, filed Jun. 28, 2017, Serial No. 201820066424.1, filed Jan. 16, 2018, Chinese patent application Serial No. 201810369688.9, filed Apr. 24, 2018, Chinese patent application Serial No. 201820584193.3, filed Apr. 24, 2018, which are incorporated herein in their entireties by reference.

FIELD OF THE INVENTION

The present invention relates generally to security surveillance, and more particularly to a lighting device having at least one low-voltage power output port, and a surveillance and lighting system having a plurality of lighting devices that use standard light sockets of an existing electricity wiring system of premises for its power supply, and a plurality of imaging devices, each imaging device being detachably plugged into (or detachably connected to) the at least one low-voltage power output port of a respective lighting device.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Security surveillance systems are popular among residential houses and commercial buildings for the purposes of surveillance. A security surveillance system typically includes a number of cameras for acquiring images of its surrounding to detect unusual incidents such as intrusions in the surrounding. Conventionally, the installation of the cameras need to install camera brackets on the exterior walls outside the house or building for accommodating the cameras and to wire electricity and data wires on the exterior walls to connect the cameras to a power box and a video recorder inside the house or building for power supply and video processing, respectively, which makes the installation process of the security surveillance system very complicated, and also time consuming and costly. The wired electricity/data wires on the exterior walls outside the house or building may make the appearance of the house or building less attractive.

Therefore, a heretofore unaddressed need exists in the art to address the aforementioned deficiencies and inadequacies.

SUMMARY OF THE INVENTION

One of the objectives of this invention is to provide a lighting device with at least one low-voltage power output port, and a surveillance and lighting system having a plurality of lighting devices that use standard light sockets of an existing electricity wiring system of premises for its power supply, and a plurality of wireless (e.g., Wi-Fi) imaging devices, each wireless (e.g., Wi-Fi) imaging device being detachably plugged into (or detachably connected to) the at least one low-voltage power output port of a respective lighting device for receiving the power. As such, the surveillance and lighting system frees (or simplifies) the installation processes of a conventional security surveillance system on the premises, such as residential houses, commercial buildings, traffic lighting systems and street lighting systems, and so on. According to the invention, the installations of the surveillance and lighting system on the premises have no need to wire any electricity/data wires on the exterior walls outside the premises.

In one aspect, the invention relates to a lighting device. The lighting device is assembled in a single unit, and when in use, is received in a standard light socket of an existing electricity wiring system connected a standard AC power source for its power supply.

In one embodiment, the lighting device includes at least one low-voltage power output port operably in an on-state in which the at least one low-voltage power output port provides a low-voltage power, or an off-state in which the at least one low-voltage power output port is tuned off; a lighting member operably in an on-state in which the lighting member emits light to illuminate the surroundings, or an off-state in which the lighting member is turned off; The power module coupled between the standard AC power source and MCU for converting an AC power of the standard 110V/220 VAC power source to low-voltage power to provide low voltages power to at least one low-voltage power output port to supply power to attached wireless (e.g., Wi-Fi) imaging device and MCU to operate the lighting member; The microcontroller unit (MCU) coupled with the lighting member for controlling operations of the lighting member in a respective state in accordance with an operation mode of the lighting device.

In one embodiment, the operation mode comprises one of a default operation mode in which the low-voltage power output is operably in the on-state, and the lighting member is operably in the off-state; a manual operation mode in which the low-voltage power output is operably in the on-state, and the state of the lighting member is operably determined by times of manually turning off and on of a switch (the switch inside building originally installed for control the associated building lighting device) during a time period interval, the switch being coupled between the power module/MCU and the standard AC power source, and acting as a regular power switch and a code generator to the MCU via the AC power source off or on; and a remote operation mode in which the low-voltage power output is operably in the on-state, and the state of the lighting member is operably determined by wirelessly transmitted signals in response to operations of a radio frequency (RF) remote control or executions of a mobile APP of a mobile device.

In one embodiment, the lighting device further includes an RF receiver coupled with the MCU for operably receiving the wirelessly transmitted signals emitted from the RF remote control in response to the operations of the RF remote control.

In one embodiment, the lighting device further includes a wireless networking module coupled with the MCU for executions of a mobile APP of a mobile device.

In one embodiment, the lighting device further includes a thermal insulation member disposed between the lighting device housing and the lighting member.

In one embodiment, the lighting member comprises light-emitting diodes (LEDs).

In one embodiment, the low-voltage power is a DC or AC power having a voltage equal to or less than 36V.

In another aspect, the invention relates to a surveillance and lighting system that uses an existing electricity wiring system connected a standard AC power source for its power supply.

In one embodiment, the surveillance and lighting system includes a plurality of lighting devices, each lighting device being detachably received in a standard light socket of the an existing electricity wiring system; a plurality of wireless (e.g., Wi-Fi) imaging devices detachably connected to the plurality of lighting devices, respectively; and a network video recorder (NVR) having a wireless networking module coupled with the plurality of imaging devices through wireless local area networking, the NVR being connected to the Internet.

In one embodiment, each lighting device is assembled in a single unit, and includes at least one low-voltage power output port operably in an on-state in which the at least one low-voltage power output port provides a low-voltage power, or an off-state in which the at least one low-voltage power output port is tuned off; a lighting member operably in an on-state in which the lighting member emits light to illuminate the surroundings, or an off-state in which the lighting member is turned off; an MCU coupled with the lighting member for controlling operations of the lighting member in a respective state in accordance with an operation mode of the lighting device; and a power module coupled between the MCU and a standard AC power source for converting an AC power of the standard AC power source to at least one low-voltage power. Each wireless (e.g., Wi-Fi) imaging device is detachably connected to (detachably plugged into) the at least at least one low-voltage power output port of a respective lighting member such that when the at least one low-voltage power output port is in the on-state, the imaging device acquires images of its surroundings and wirelessly transmitting the acquired images to the NVR, and when the at least one low-voltage power output port is in the off-state, the imaging device is tuned off.

In one embodiment, each wireless (e.g., Wi-Fi) imaging device comprises one or more cameras, one or more CCDs, one or more photosensors, or a combination of them. In one embodiment, each imaging device further comprises one or more infrared cameras, or one or more infrared sensors to acquire infrared images during a night time. In one embodiment, the lighting member comprises LEDs.

In one embodiment, the NVR is configured to record and process the acquired images/video by each imaging device in real time, and save the acquired images/video on its internal memory media (e.g., hard drive, SD card, and so on) locally onsite, and/or provide internet remote viewing and playback, and send an alert to one or more client terminals when an unusual incident is identified in the acquired images.

In one embodiment, the operation mode comprises one of a default operation mode in which the at least one low voltage output port in on-state so the attached imaging device is operably in the on-state, and the lighting member is operably in the off-state; a manual operation mode in which the at least one low voltage output port in on-state so the attached the imaging device is operably in the on-state, and the state of the lighting member is operably determined by times of manually turning off and on of a switch during a time period, the switch being coupled between the power module/MCU and the standard AC power source, and acting as a regular power switch and a code generator to the MCU via the AC power source off or on as well; and a remote operation mode in which the imaging device is operably in the on-state, and the state of the lighting member is operably determined by wirelessly transmitted signals in response to operations of a radio frequency (RF) remote control or executions of a mobile APP of a mobile device. In one embodiment, each lighting device further comprises an RF receiver coupled with the power module and/or the MCU for operably receiving the wirelessly transmitted signals emitted from the RF remote control in response to the operations of the RF remote control.

In one embodiment, each lighting device further comprises a wireless networking module coupled with the power module and/or the MCU for operably receiving the wirelessly transmitted signals in response to the executions of the mobile APP of the mobile device.

In one embodiment, each lighting device further comprises a thermal insulation member disposed between the lighting device housing and the lighting member.

In one embodiment, the RF remote control is configured to control operations of each of the plurality of lighting device's lighting member individually or coordinately.

In one embodiment, the mobile APP is configured to control operations of each of the plurality of lighting device's lighting member individually or coordinately.

These and other aspects of the present invention will become apparent from the following description of the preferred embodiments taken in conjunction with the following drawings, although variations and modifications thereof may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third, etc. may be used herein to describe various elements, components, regions and/or sections, these elements, components, regions and/or sections should not be limited by these terms. These terms are only used to distinguish one element, component, region, layer or section from another element, component, region, layer or section. Thus, a first element, component, region, or section discussed below could be termed a second element, component, region, or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "central processing unit", or its acronym "CPU", refers to one or more processors, more specifically to its processing unit and control unit within a computer or a control apparatus that carries out the instructions of a computer program by performing the basic arithmetic, logical, control and input/output (I/O) operations specified by the instructions.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

As used herein, the term "microcontroller unit" and its acronym "MCU", is a small computer on a single integrated circuit (IC) chip that can execute programs for controlling other devices or machines. A microcontroller unit contains one or more CPUs (processor cores) along with memory and programmable input/output (I/O) peripherals, and is usually designed for embedded applications.

As used herein, the term "server" generally refers to a system that responds to requests across a computer network to provide, or help to provide, a network service. An implementation of the server may include software and suitable computer hardware. A server may run on a computing device or a network computer. In some cases, a computer may provide several services and have multiple servers running.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The description is now made as to the embodiments of the invention in conjunction with the accompanying drawings. In accordance with the purposes of this invention, as embodied and broadly described herein, this invention, in one aspect, relates to a lighting device, and a security surveillance system having a plurality of lighting devices that use standard light sockets of an existing electricity wiring system of premises for its power supply so as to free (or simplify) installation processes of the security surveillance system on the premises, such as residential houses, commercial buildings, traffic lighting systems and street lighting systems, and so on.

Figure 1A:
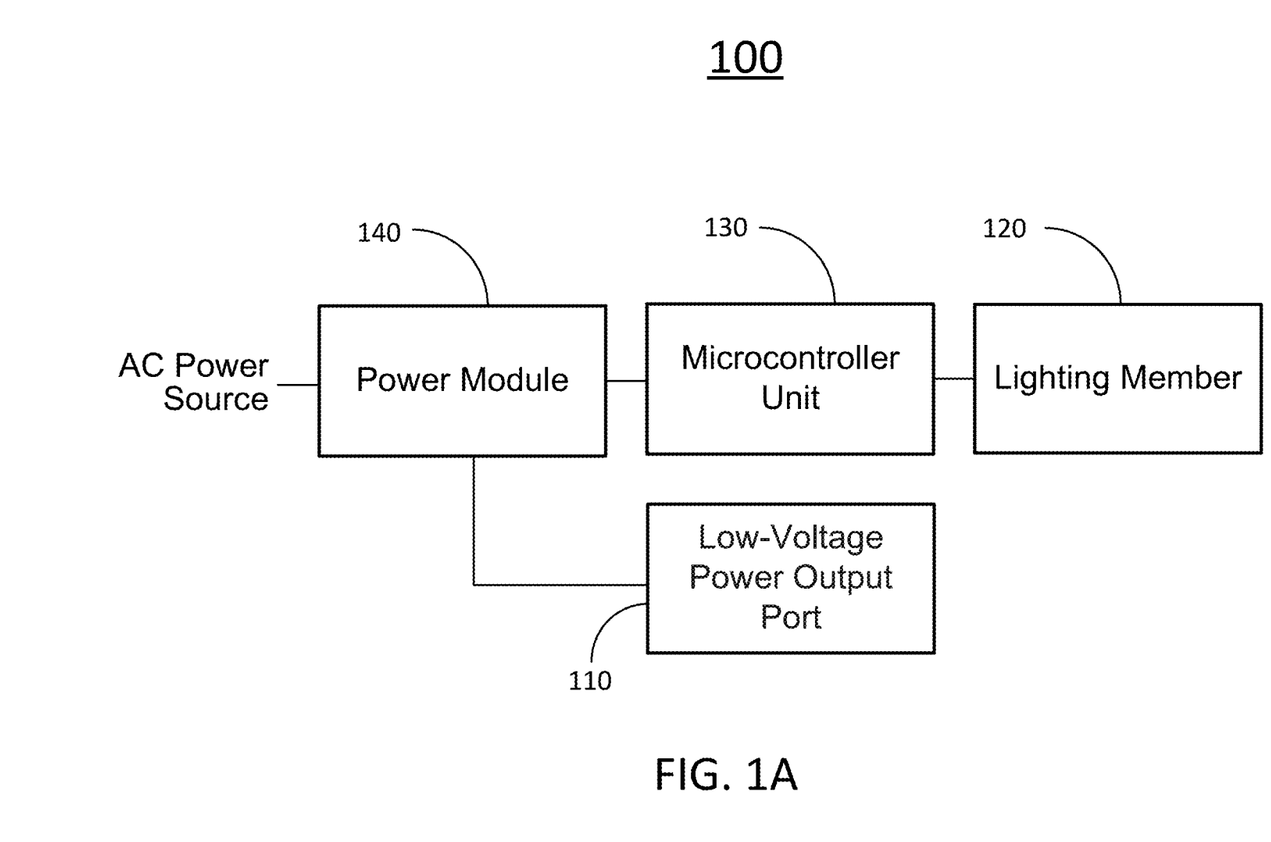
FIG. 1A shows schematically a lighting device according to one embodiment of the present invention.

Referring to FIG. 1A, a lighting device 100 is schematically shown according to one embodiment of the invention. In the exemplary embodiment, the lighting device 100 includes a low-voltage power output port 110, a lighting member 120, a microcontroller unit (MCU) 130, and a power module 140. When in use, the lighting device 100 is received in a standard light socket of an existing electricity wiring system of a premises connected a standard AC power source for its power supply. The standard light socket can be an E26 Edison socket, an E27 Edison socket, a B22 Bayonet socket, or the likes. Depending upon where the lighting device is used, the standard AC power source may refer to, for example, an AC power having a voltage of about 110 volts at a frequency of about 60 Hz in the North American standard, or an AC power having a voltage of about 220 volts at a frequency of about 50 Hz in the European standard.

The low-voltage power output port 110 is connected to the power module 140 and can be operably in an on-state when the lighting device receives the AC power (the switch is on) or an off-state when the lighting device does not receive the AC power (the switch is off). When the low-voltage power output port 110 is in the on-state in which the low-voltage power output port 110 is turned on and a low-voltage power is provided therefrom, while when the low-voltage power output port 110 is the off-state in which the low-voltage power output port 100 is tuned off and no power is provided therefrom.

According to the invention, the lighting device includes at least one low-voltage power output port and each low-voltage power output port may output a same low-voltage power or different low-voltage powers for various uses. For the purpose of concise descriptions, in this and other exemplary embodiments shown in FIGS. 1A, 1B, 2, 3, 4A and 4B, one low-voltage power output port is disclosed.

The lighting member 120 is coupled to the MCU 130 and can be operably in an on-state. When the lighting member 120 is in the on-state, the lighting member 120 is turned on and emits light to illuminate the surroundings, while the lighting member 120 is in the off-state, the lighting member is turned off and emits no light. In one embodiment, the lighting member 120 includes, but is not limited to, light-emitting diodes (LEDs), or any other lighting devices.

The MCU 130 is coupled with the power module 140 and the lighting member 120 and is configured to control operations of the lighting member 120 in a respective state in accordance with an operation mode of the lighting device.

The power module 140 coupled between the low-voltage power output port 100/MCU 130 and the standard AC power source. The power module 140 may include resistors, capacitors, inductors, rectifying diodes, Zener diodes, and transformers for converting an AC power, e.g., 110V at 60 Hz or 220V at 50 Hz, of the standard AC power source to at least one DC or AC power with a low-voltage, e.g., 3V, 4V, 5V, 6V, 12V, 24V, 36V and so on. Those of skill in the art will appreciate the wide variety of power modules and configurations available.

In one embodiment, the operation mode is a default operation mode, a manual operation mode, or a remote operation mode. In order for the low-voltage power output port 110 to provide low-voltage powers for use, the low-voltage power output port 110 is normally set in the on-state in all the operation modes as soon as the lighting device 100 receive the AC power (as the switch is on), so as to enable the low-voltage power output port 110 to provide the low-voltage powers in 24 hours a day and 7 days a week. It should be appreciated by those of skill in the art that the low-voltage power output port 110 can also be operated in the off-state depending on need (as the switch is off).

When the lighting device 100 operates in the default operation mode, the low-voltage power output port 110 is operably in the on-state, while the lighting member 120 is operably in the off-state.

When the lighting device 100 operates in the manual operation mode, the low-voltage power output port 110 is operably in the on-state all the time when a 110V/220V AC power is provided to the MCU 130 as the switch is on, while the state of the lighting member 120 is operably determined by times of manually turning on and off of a switch during a time period, where the switch is coupled between the power module 140/MCU 130 and the standard AC power source (e.g., through an electrical power breaker box of the existing electricity wiring system). The switch is normally switched on so as to ensure the low-voltage power output port 110 is powered on in the on-state. Usually, the MCU 130 is configured to set the lighting member 120 in the off-state as default. In certain embodiments, if a user manually turns the switch off and on one or more times during a time period interval, e.g., less than 2 seconds interval per cycle, the MCU 130 sets the lighting member 120 in the on-state. In certain embodiments, if the user manually turns off the switch for more than a predefined time, e.g., 3 seconds, and then turns it on back, the MCU 130 resets itself and the lighting device will operate in the default operation off-state mode, the low voltage output port and imaging device is operably in the on-state, and the lighting member is operably in the off-state.

When the lighting device operates in the remote operation mode, the low-voltage power output port 110 is operably in the on-state, while the state of the lighting member 120 is operably determined by wirelessly transmitted signals in response to operations of a radio frequency (RF) remote control or executions of a mobile APP of a mobile device. In the embodiment, the MCU 130 may couple with a RF receiver and/or a wireless networking transceiver for receiving the wirelessly transmitted signals.

In one embodiment, a user can further operate the RF remote control to set the lighting member 120 in the on-state or in the off-state. For example, pressing an ON button of the RF remote control turns the lighting member 120 in the on-state, and pressing an OFF button of the RF remote control turns the lighting member 120 in the off-state. Similarly, the user can also set the lighting member 120 in the on-state or in the off-state though the mobile APP installed in the mobile device.

Figure 1B:
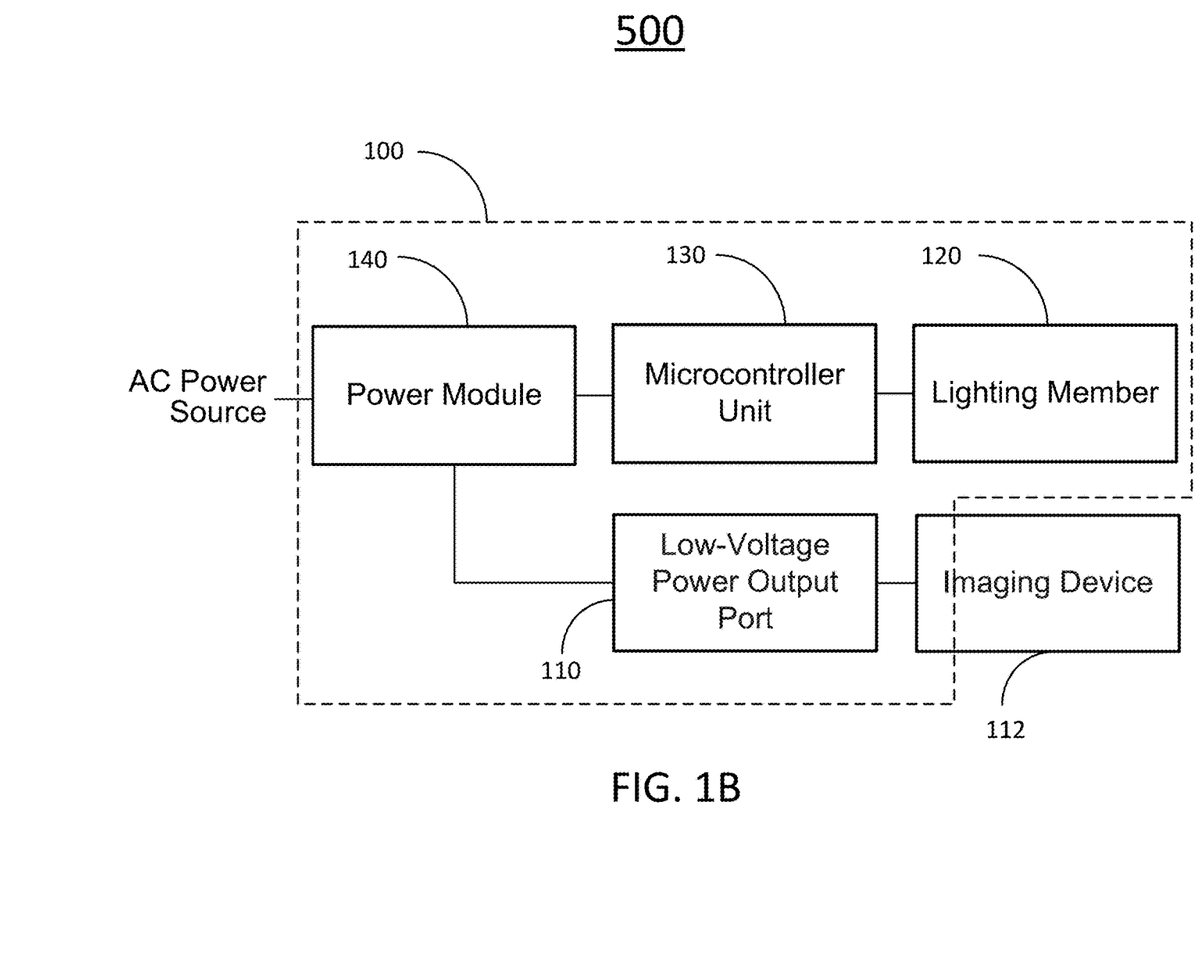
FIG. 1B shows schematically an image device and the lighting device of FIG. 1A connected to each other according to one embodiment of the present invention.

According to the invention, the lighting device is primarily used in a security surveillance system, an imaging device 112 is connected to the low-voltage power output port 110 of the lighting device 100 for acquiring images, which constitutes an imaging and light device 500, as shown in FIG. 1B. Similar to the lighting device 100, the operation mode of the imaging and lighting device 500 also includes the default operation mode, the manual operation mode, or the remote operation mode, where the low-voltage power output port 110 is normally set in the on-state in all the operation modes, so as to enable the imaging device 112 to acquire the images of its surroundings in 24 hours a day and 7 days a week for the purpose of surveillance.

In certain embodiments, the imaging device 112 includes, but is not limited to, one or more cameras, one or more charge coupled devices (CCDs), one or more photosensors, or a combination of them or any types of imaging means. In certain embodiments, the low-voltage power output port 110 may further comprise one or more infrared cameras, or one or more infrared sensors to acquire infrared images during a night time.

Figure 2:
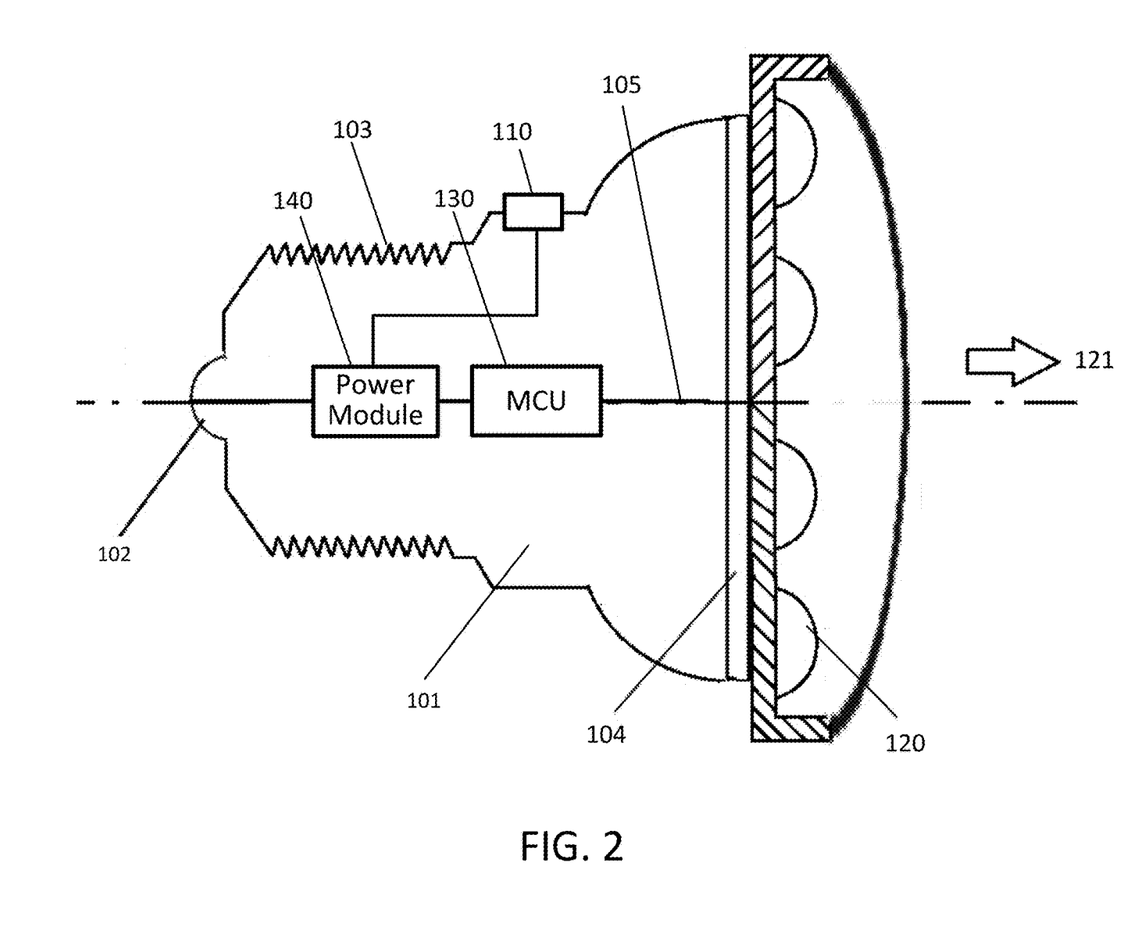
FIG. 2 shows schematically a lighting device according to one embodiment of the present invention.
Figure 3:
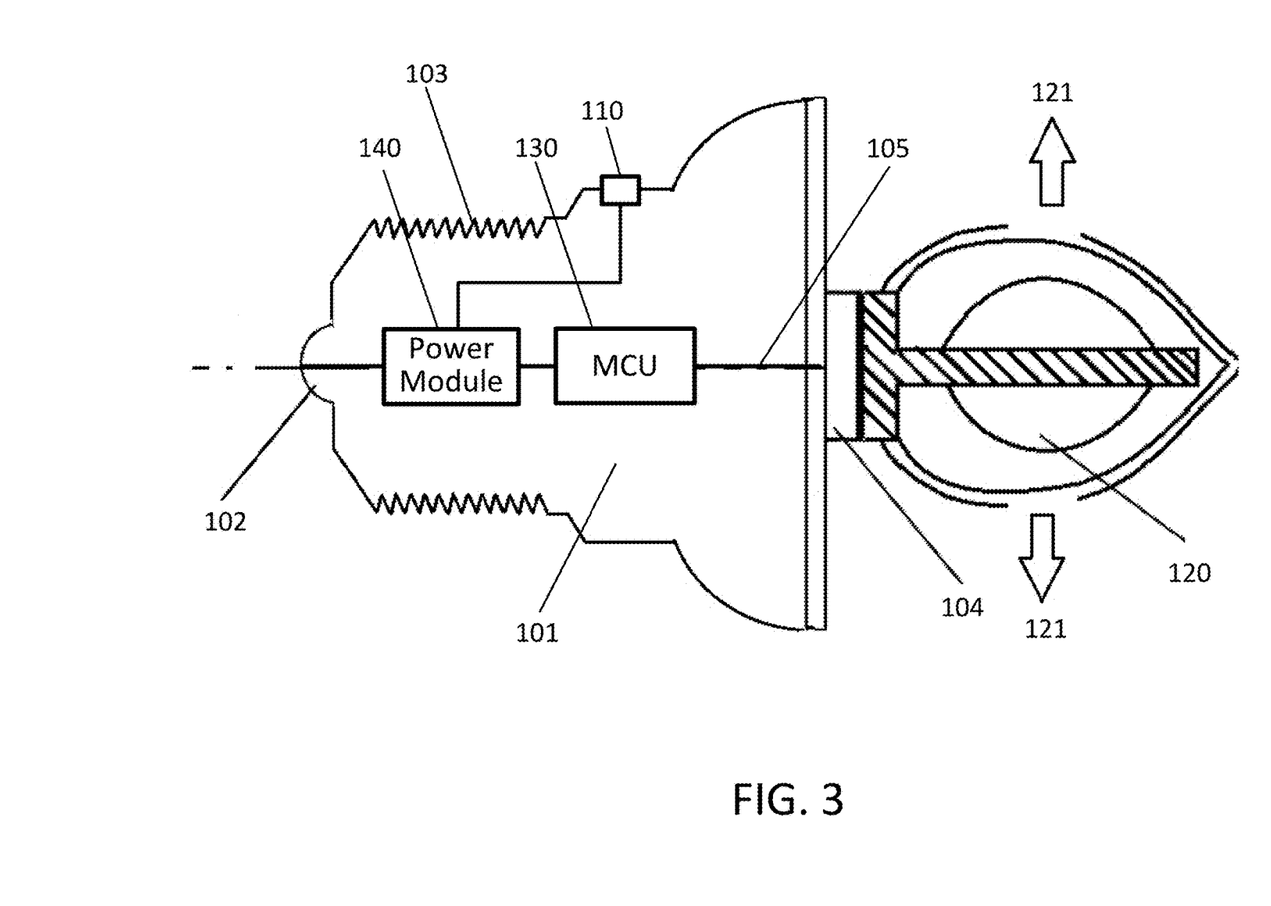
FIG. 3 shows schematically a lighting device according to one embodiment of the present invention.

According to embodiments of the invention, the lighting device is assembled in a single unit, as shown in FIGS. 2 and 3. The lighting device has a connection portion 103 adapted to connect the lighting device to a standard light socket of an existing electricity wiring system for its power supply, and a housing 101 extending from the connection portion 103. The power module 140, the MCU 130 and the lighting member 120 are accommodated in the connection portion 103 and/or housing 101, while the low-voltage power output port 110 is disposed on the wall of the housing 101. In the exemplary embodiments, the lighting device also includes a thermal insulation member 104 disposed between the housing 101 and the lighting member 120 to reduce the heat transfer from the light member 120 including the LEDs to the housing 101. The lighting device also includes a bottom contact point 102 to ensure the lighting device is in contact with the AC power source when the lighting device is received in a standard light socket of the existing electricity wiring system. In addition, the LEDs can be detachably attached to the lighting member 120, which makes upgrade and maintenance of the LED lighting member 120 easier.

In the embodiment shown in FIG. 2, the illumination 121 of the lighting member 120 is along a central axis 105 of the lighting device. However, in the embodiment shown in FIG. 3, the illumination 121 of the lighting member 120 is perpendicular to the axis 105, which are along the radial directions. It should be appreciated by those of skill in the art that other arrangements of the lighting member 120 can also be utilized to practice the invention.

Figure 4A:
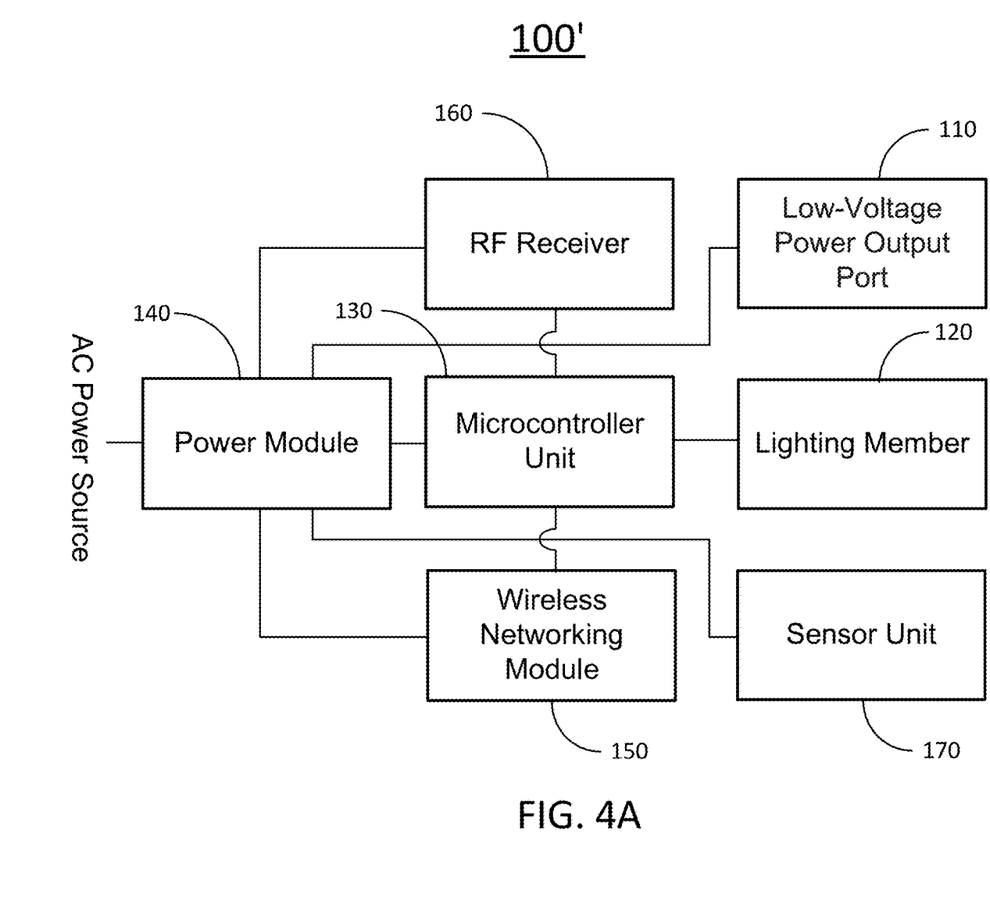
FIG. 4A shows schematically a lighting device according to one embodiment of the present invention.

Referring to FIG. 4A, the lighting device 100' is schematically shown according to one embodiment of the invention. In the exemplary embodiment, the lighting device 100' may also further include an RF receiver 160 coupled with the MCU 130 for operably receiving the wirelessly transmitted signals emitted from the RF remote control in response to the operations of the RF remote control, and a wireless networking module 150 coupled with the MCU 130 for operably receiving the wirelessly transmitted signals in response to the executions of the mobile APP of the mobile device. The wireless networking module may include a WiFi® transceiver. The mobile device can be a smartphone, a tablet, a smartwatch, a PDA (personal digital assistant), a laptop, or the likes.

Furthermore, as shown in FIG. 4A, the lighting device 100' may further include a sensor unit 170 coupled to the power module 140. The sensor unit 170 may have one more motion sensors for detecting movement events of the surrounding, so as to activate the lighting member 120 and send alert. The sensor unit 170 may have one more Photosensors/PIR sensors for detecting an ambient light/IR level of the surrounding.

Moreover, the lighting device 100' may also further include means for generating electricity from solar, e.g., one or more solar panels.

Figure 4B:
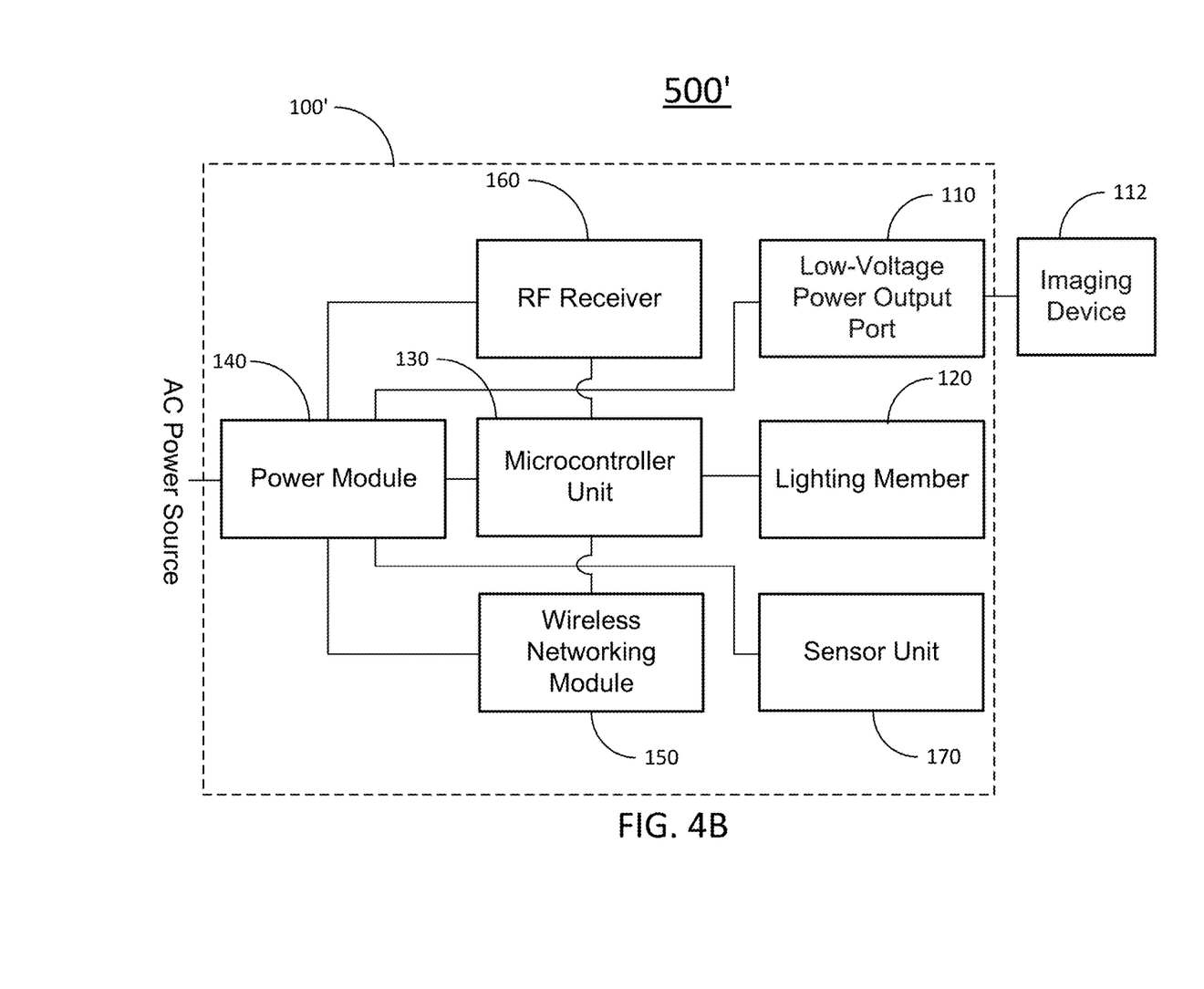
FIG. 4B shows schematically an image device and the lighting device of FIG. 4A connected to each other according to one embodiment of the present invention.

In certain embodiments, when the lighting device 100' is used in a security surveillance system, an wireless (e.g., Wi-Fi) imaging device 112 is connected to the low-voltage power output port 110 of the lighting device 100' for acquiring images, which constitutes an imaging and light device 500', as shown in FIG. 4B. Similar to the lighting device 100', the operation mode of the imaging and lighting device 500' also includes the default operation mode, the manual operation mode, or the further remote operation mode, where the low-voltage power output port 110 is normally set in the on-state in all the operation modes, so as to enable the wireless (e.g., Wi-Fi) imaging device 112 to acquire the images of its surroundings in 24 hours a day and 7 days a week (as soon as the light device 100' receive the AC power) for the purpose of surveillance.

Figure 5:
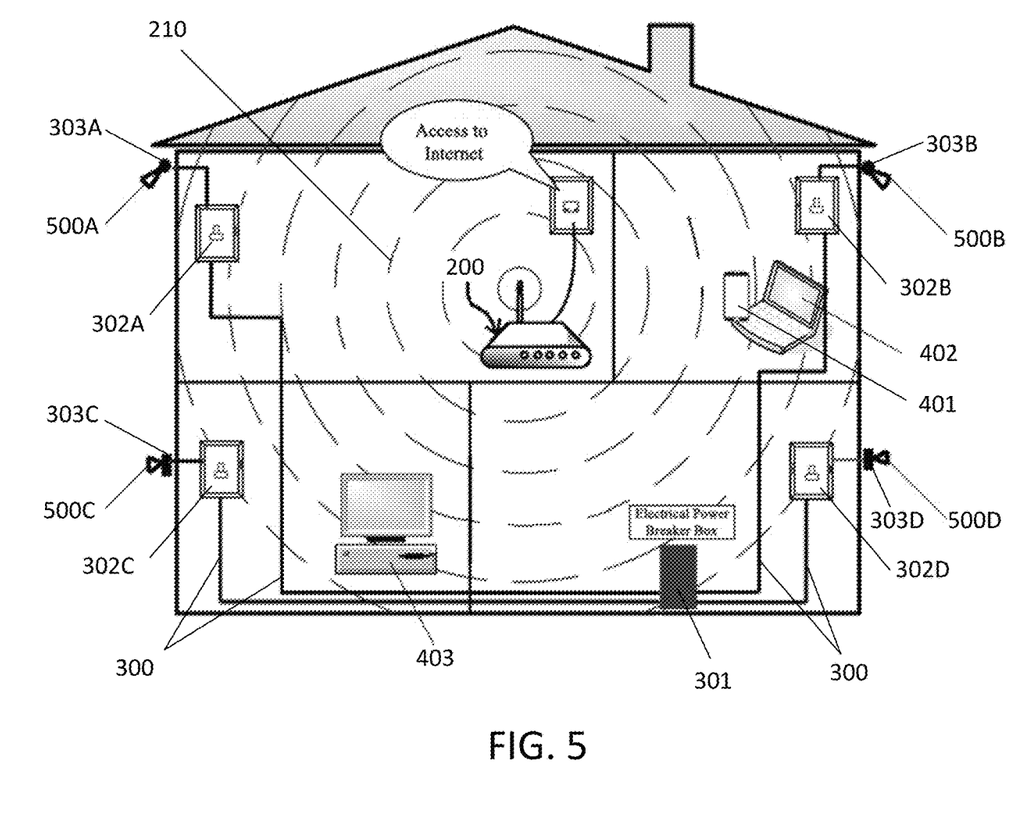
FIG. 5 shows schematically a surveillance and lighting system according to one embodiment of the present invention.

FIG. 5 shows schematically a surveillance and lighting system according to one embodiment of the invention. The surveillance and lighting system utilizes the existing home electricity wiring system 300 for the power supply, without any wiring modification or wiring installation. The existing home electricity wiring system 300 includes, but is not limited to, an electrical power breaker box 301 being directly connected to the AC power source, switches 302A, 302B, 302C and 302D, flood light sockets 303A and 303B, door light sockets 303C and 303D. Each of the flood light sockets 303A and 303B and the door light sockets 303C and 303D is connected to the electrical power breaker box 301 through a corresponding switch 302A, 302B, 302C or 302D. Each switch 302A, 302B, 302C or 302D is pre-installed on walls inside the house for switching the power supply on or off for the corresponding the light sockets 303A, 303B, 303C or 303D.

In the exemplary embodiment shown in FIG. 5, the surveillance and lighting system has four lighting and imaging combination devices 500A, 500B, 500C and 500D, each of which includes a lighting device 100 or 100', as shown in FIGS. 1A, 2, 3 and 4A, and an wireless (e.g., Wi-Fi) imaging device 112, as shown in FIGS. 1B and 4B, placed in a standard light socket of the existing electricity wiring system 300. The lighting device 100 or 100' is assembled in a single unit and the wireless (e.g., Wi-Fi) imaging device 112 is detachably plugged in the low-voltage power output port 110 of the lighting device 100 or 100'. The lighting and imaging combination devices 500A and 500B are placed in the flood light sockets 303A and 303B, respectively, while the lighting and imaging combination devices 500C and 500D are placed in the door light sockets 303C and 303D, respectively. Each of the lighting and imaging combination devices 500A, 500B, 500C and 500D is disclosed as above. It should be appreciated by those of skill in the art that other arrangements of other numbers of the lighting devices can also be utilized to practice the invention.

In certain embodiments, the operation of each lighting device is controlled by its MCU. The operation mode of each lighting device includes, but is not limited to, a default operation mode, a manual operation mode, or a further remote operation mode. Since one of the purposes of the system is for surveillance, for each lighting device the wireless (e.g., Wi-Fi) imaging device is normally set in the on-state in all the operation modes, so as to enable the wireless (e.g., Wi-Fi) imaging device to acquire the images of its surroundings in 24 hours a day and 7 days a week for the purpose of surveillance. It should be appreciated by those of skill in the art that the imaging device can also be operated in the off-state depending on need.

When the lighting device operates in the default operation mode, the wireless (e.g., Wi-Fi) imaging device is operably in the on-state, and the lighting member is operably in the off-state.

When the lighting device operates in the manual operation mode, the wireless (e.g., Wi-Fi) imaging device is operably in the on-state all the time when a the power module receive the AC power and DC power is delivered to the MCU as the switch is on, while the state of the lighting member is operably determined by times of manually turning off and on of a switch during a time period, where the switch is coupled between the power module/MCU and the standard AC power source. The switch is normally switched on so as to ensure the low voltage power outlet delivers the power and the imaging device is powered on in the on-state. Usually, the MCU is configured to set the lighting member in the off-state. In certain embodiments, if a user manually turns the switch off and on one or more times during a time period interval, e.g., less than 2 seconds interval per cycle, the MCU 130 sets the lighting member 120 in the on-state. In certain embodiments, if the user manually turns off the switch for more than a predefined time, e.g., 3 seconds, and then turns it on back, the MCU 130 resets itself and the lighting device will operate in the default operation mode, the imaging device is operably in the on-state, and the lighting member is operably in the off-state.

When the lighting device further operates in the remote operation mode, the imaging device is operably in the on-state, while the state of the lighting member is operably determined by wirelessly transmitted signals in response to operations of a RF remote control or executions of a mobile APP of a mobile device 401 or 402.

In one embodiment, a user can further operate the RF remote control to set the lighting member of each lighting device individually or coordinately in the on-state or in the off-state. For example, the user can select one or more lighting devices to be controlled, pressing an ON button of the RF remote control turns the lighting member of the selected lighting devices in the on-state, and pressing an OFF button of the RF remote control turns the lighting member of the selected lighting devices in the off-state. Similarly, the user can also set the lighting member of each lighting device individually or coordinately in the on-state or in the off-state though the mobile APP installed in the mobile device 401 or 402.

In addition, the operations of the lighting devices may also be further triggered by certain events/incidents, for example, but are not limited to, a movement, smoking, explosion and so on, in the surrounding of the house.

The surveillance and lighting system also includes an NVR 200. In one embodiment, the NVR 200 is connected to the Internet through an Ethernet connection. The NVR 200 is configured to record and process the acquired images by each wireless (e.g., Wi-Fi) imaging device in real time and send an alert to one or more client terminals, e.g., a smartphone 401, and/or a laptop 402, when an unusual incident is identified in the acquired images. Additionally, the acquired images are stored in internal memory media (e.g., HDD, SD card, and so on) of the NVR locally onsite. Furthermore, the acquired images may be stored in a cloud server, a database server, and/or a computer 403.

By replacing the conventional door/flood lights with the invented lighting devices which supply low voltage power to a connected imaging device, e.g., Wi-Fi® HD cameras, built in, and connected to the associated Wi-Fi® NVR 200 inside the house, the imaging device, e.g., Wi-Fi® HD cameras, of the lighting device starts to acquire the image of the surrounding and send the video stream via the Wi-Fi® network 210 to the NVR 200, the security surveillance coverage can be immediately established on the entire house. The NVR 200 records the video on its in internal memory media, processes it and sends alerts to the mobile device when an unusual incident is identified in the acquired images/video through the Internet. This configuration totally eliminates the requirement for security surveillance camera wiring. All of the cameras of the system get their power from the existing house electricity wiring system through the lighting device low voltage output port and sends videos via the Wi-Fi® network to the NVR.

In addition, the operations of the surveillance and lighting system are very easy. For example, after screwing the lighting devices 100A, 100B, 100C and 100D into the flood light sockets 303A and 303B and the door light sockets 303C and 303D, respectively, Then plugging the Wi-Fi HD camera power connecter to the lighting device the low voltage power output port. turning on the corresponding switch 302A, 302B, 302C and 302D will start the surveillance and lighting system which operates in the default operation off-state mode, where the wireless (e.g., Wi-Fi) imaging device of each lighting device is operably in the on-state, and the lighting member of each lighting device is operably in the off-state.

A user can change them from the default operation mode to the manual operation mode or the further remote operation mode anytime. For example, during the day or night time, if the user would like to turn the lighting member of a lighting device in the on-state, the user can manually turns the corresponding switch off and on one or more times during a time period interval, e.g., less than 2 seconds interval per cycle, said lighting member will be set in the on-state; If the user would like to turn the lighting member of a lighting device in the off-state, the user can manually turns off the corresponding switch for more than a predefined time, e.g., more than 2 seconds, and then turns it on back, the MCU 130 resets itself and the lighting device will operate in the default operation mode, the low voltage output port and connected imaging device is operably in the on-state, and the lighting member is operably in the off-state, said lighting member will be set in the off-state.

To further change them from the default operation mode or the manual operation mode to the remote operation mode, the user can select one or more lighting devices to be controlled, pressing an ON button of the RF remote control turns the lighting member of the selected lighting devices in the on-state, and pressing an OFF button of the RF remote control turns the lighting member of the selected lighting devices in the off-state. Similarly, the user can also set the lighting member of each lighting device individually or coordinately in the on-state or in the off-state though the mobile APP installed in the mobile device 401 or 402.

According to the invention, the surveillance and lighting system can be employed for surveillance and lighting of residential houses, office buildings, shops, streets, and the others. Furthermore, the lighting devices and the surveillance and lighting system can be installed by plugging them in the existing electricity wire system without need to wire any electricity/data wires on the exterior walls outside the premises.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope as is discussed and set forth above and below including claims and drawings. Furthermore, the embodiments described above and claims set forth below are only intended to illustrate the principles of the present invention and are not intended to limit the scope of the invention to the disclosed elements. Accordingly, the scope of the present invention is defined by the appended claims rather than the foregoing description and the exemplary embodiments described therein.

What is claimed is:

1. A lighting device, comprising:
    at least one low-voltage power output port operably in an on-state in which the at least one low-voltage power output port provides a low-voltage power, or an off-state in which the at least one low-voltage power output port is turned off;
    a lighting member operably in an on-state in which the lighting member emits light to illuminate the surroundings, or an off-state in which the lighting member is turned off;
    a microcontroller unit (MCU) coupled with the lighting member for controlling operations of the lighting member in a respective state in accordance with an operation mode of the lighting device; and
    a power module coupled between the at least one low-voltage power output port and a standard AC power source and between the MCU and the standard AC power source for converting an AC power of the standard AC power source to at least one low-voltage power for the at least one low-voltage power output port and the MCU,
    wherein the lighting device is assembled in a single unit and received in a standard light socket connected to the standard AC power source for its power supply when in use; and
    wherein the operation mode comprises one of:
        a default operation mode in which the at least one low-voltage power output is operably in the on-state, and the lighting member is operably in the off-state;
        a manual operation mode in which the at least one low-voltage power output is operably in the on-state, and the state of the lighting member is operably determined by the number of times of manually turning off and on of a switch during a time period interval, the switch being coupled between the power module/MCU and the standard AC power source, and acting as a regular power switch and a code generator to the MCU via turning the standard AC power source off or on; and
        a remote operation mode in which the at least one low-voltage power output is operably in the on-state, and the state of the lighting member is operably determined by wirelessly transmitted signals in response to operations of a radio frequency (RF) remote control or executions of a mobile APP of a mobile device.

2. The lighting device of claim 1, further comprising an RF receiver coupled with the power module and/or the MCU for operably receiving the wirelessly transmitted signals emitted from the RF remote control in response to the operations of the RF remote control.

3. The lighting device of claim 1, further comprising a wireless networking module coupled with the power module and/or the MCU for operably receiving the wirelessly transmitted signals in response to the executions of the mobile APP of the mobile device.

4. The lighting device of claim 1, further comprising a thermal insulation member disposed between the lighting device housing and the lighting member.

5. The lighting device of claim 1, wherein the at least one low voltage output port provides low-voltage power that is a DC or AC power having a voltage equal to or less than 36V.

6. The lighting device of claim 1, wherein the lighting member comprises light-emitting diodes (LEDs).

7. A surveillance and lighting system that uses an existing electricity wiring system connected to a standard AC power source for its power supply, comprising:
    a plurality of lighting devices, each lighting device being received in a standard light socket of the an existing electricity wiring system;
    a plurality of wireless imaging devices detachably connected to the plurality of lighting devices, respectively; and
    a network video recorder (NVR) having a wireless networking module coupled with the plurality of lighting devices and the plurality of imaging devices through wireless local area networking, the NVR being connected to the Internet,
    wherein each lighting device is assembled in a single unit and comprises:
        at least one low-voltage power output port operably in an on-state in which the at least one low-voltage power output port provides a low-voltage power, or an off-state in which the at least one low-voltage power output port is turned off;
        a lighting member operably in an on-state in which the lighting member emits light to illuminate the surroundings, or an off-state in which the lighting member is turned off;

a microcontroller unit (MCU) coupled with the lighting member for controlling operations of the lighting member in a respective state in accordance with an operation mode of the lighting device; and a power module coupled between the at least one low-voltage power output port and a standard AC power source and between the MCU and the standard AC power source for converting an AC power of the standard AC power source to at least one low-voltage power for the at least one low-voltage power output port and the MCU; and wherein each imaging device is detachably connected to the at least one low-voltage power output port of a respective lighting device such that when the at least one low-voltage power output port is in the on-state, the imaging device acquires images of its surroundings and wirelessly transmitting the acquired images to the NVR, and when the at least one low-voltage power output port is in the off-state, the imaging device is turned off; and wherein the operation mode comprises one of:

a default operation mode in which the at least one low-voltage power output is operably in the on-state so the attached imaging device is operably in the on-state, and the lighting member is operably in the off-state;

a manual operation mode in which the at least one low-voltage power output is operably in the on-state so the attached imaging device is operably in the on-state, and the state of the lighting member is operably determined by the number of times of manually turning off and on of a switch during a time period interval, the switch being coupled between the power module/MCU and the standard AC power source, and acting as a regular power switch and a code generator to the MCU via turning the standard AC power source off or on; and a remote operation mode in which the at least one low-voltage power output is operably in the on-state so the attached imaging device is operably in the on-state, and the state of the lighting member is operably determined by wirelessly transmitted signals in response to operations of a radio frequency (RF) remote control or executions of a mobile APP of a mobile device.

8. The surveillance and lighting system of claim 7, wherein each lighting device further comprises an RF receiver coupled with the power module and/or the MCU for operably receiving the wirelessly transmitted signals emitted from the RF remote control in response to the operations of the RF remote control.

9. The surveillance and lighting system of claim 7, wherein each lighting device further comprises a wireless networking module coupled with the power module and/or the MCU for operably receiving the wirelessly transmitted signals in response to the executions of the mobile APP of the mobile device.

10. The surveillance and lighting system of claim 7, wherein the RF remote control is configured to control operations of each of the plurality of lighting devices individually or coordinately.

11. The surveillance and lighting system of claim 7, wherein the mobile APP is configured to control operations of each of the plurality of lighting devices individually or coordinately.

12. The surveillance and lighting system of claim 7, wherein each lighting device further comprises a thermal insulation member disposed between the lighting device housing and the lighting member.

13. The surveillance and lighting system of claim 7, wherein the wireless imaging device comprises one or more cameras, one or more charge coupled devices (CCDs), one or more photosensors, or a combination of them.

14. The surveillance and lighting system of claim 13, wherein the wireless imaging device further comprises one or more infrared cameras, or one or more infrared sensors to acquire infrared images during a night time.

15. The surveillance and lighting system of claim 7, wherein the lighting member comprises light-emitting diodes (LEDs).

16. The surveillance and lighting system of claim 7, wherein the NVR is configured to record and process the acquired images by each imaging device in real time and save the video in internal memory media of the NVR locally onsite and send an alert to one or more client terminals when an unusual incident is identified in the acquired images and provide remote viewing and playback.

* * * * *